United States Patent [19]

Mizuno et al.

[11] 4,223,754
[45] Sep. 23, 1980

[54] INSTRUMENT PANEL DEVICE FOR CARS

[75] Inventors: Hiroshi Mizuno, Higashi-Kurume; Seiichiro Kobayashi, Tokyo, both of Japan

[73] Assignee: Honda Giken Kogyo Kabushiki Kaisha, Tokyo, Japan

[21] Appl. No.: 891,723

[22] Filed: Mar. 30, 1978

[30] Foreign Application Priority Data

Apr. 1, 1977 [JP] Japan ............................ 52-40415[U]

[51] Int. Cl.² ............................................ B60H 1/00
[52] U.S. Cl. ............................ 180/90; 98/2.08; 98/2.09; 296/37.12
[58] Field of Search ............ 180/90; 98/2, 2.08, 98/2.09, 2.16; 296/37.12

[56] References Cited

U.S. PATENT DOCUMENTS

| | | | |
|---|---|---|---|
| 2,295,750 | 9/1942 | Norris | 180/90 X |
| 2,966,952 | 1/1961 | Wilfert | 180/90 |
| 3,638,551 | 2/1972 | Morchen | 98/2.16 |
| 3,640,457 | 2/1972 | Colinet | 98/2.07 X |
| 3,693,532 | 9/1972 | Colinet | 98/2.08 X |

FOREIGN PATENT DOCUMENTS

| | | | |
|---|---|---|---|
| 1455640 | 2/1969 | Fed. Rep. of Germany | 98/2.09 |
| 2230775 | 1/1974 | Fed. Rep. of Germany | 180/90 |
| 2636640 | 2/1978 | Fed. Rep. of Germany | 98/2 |
| 78178 | 5/1962 | France | 180/90 |
| 933093 | 8/1963 | United Kingdom | 180/90 |
| 1255611 | 12/1971 | United Kingdom | 98/2.08 |

*Primary Examiner*—John P. Silverstrim
*Attorney, Agent, or Firm*—Irving M. Weiner; John L. Shortley; Melvin Yedlin

[57] ABSTRACT

An instrument panel device for automobiles, particularly cars, wherein the space on the rear side of the instrument panel is employed to provide air conduits for feeding conditioned air to the interior of the automobile. A closing plate is employed to close the space on the rear side of the instrument panel, and the closed space is vertically sectioned with a partition plate to provide two systems of air conduit passages which are insulated from each other. The respective air conduit passages communicate with blowing ports provided on the front surface of the instrument panel, with defroster blowing ports, and with side defogger blowing ports.

4 Claims, 7 Drawing Figures

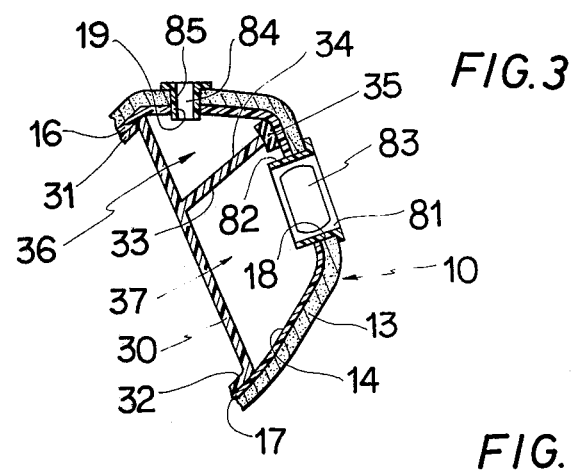
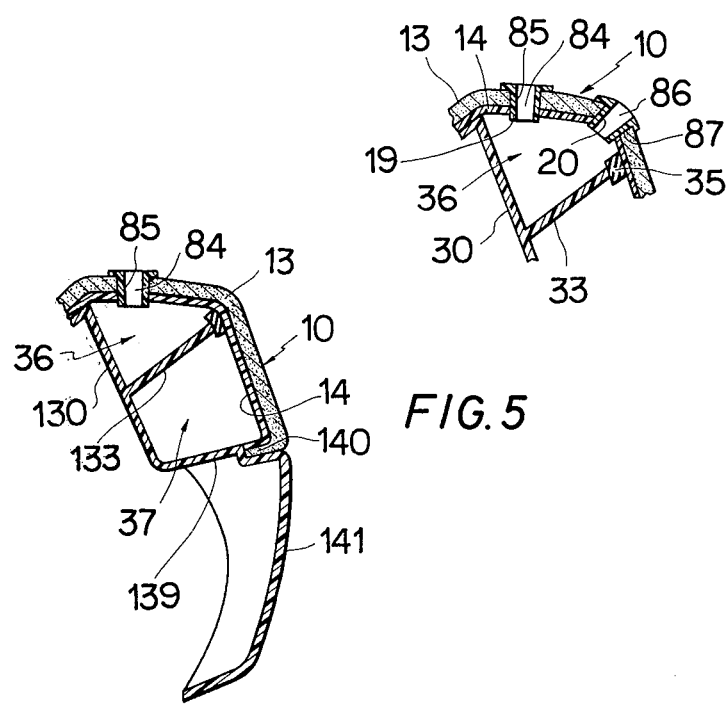

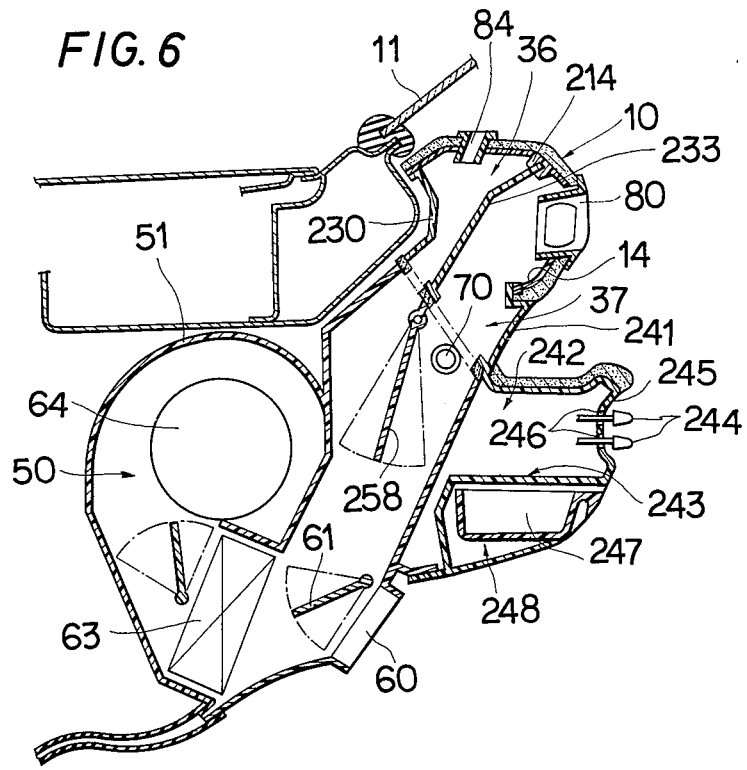
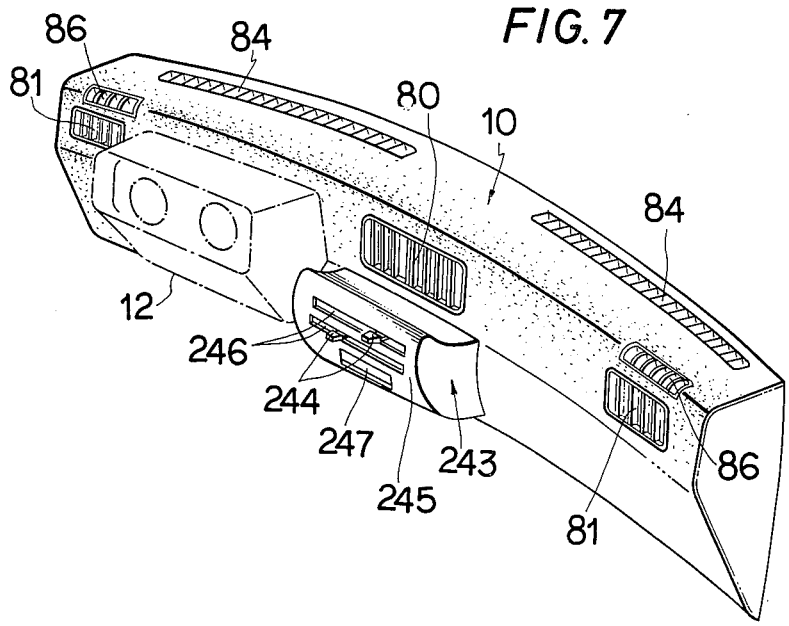

INSTRUMENT PANEL DEVICE FOR CARS

FIELD OF THE INVENTION

The present invention relates generally to an instrument panel device for automobiles, which is combined with an air conduit.

More particularly, the present invention relates to an instrument panel device for automobiles, particularly cars, wherein the space on the rear side of the instrument panel is used as an air conduit and is sectioned vertically with a partition plate formed integrally with a closing plate forming the space. A passage feeding conditioned air into the car body and a passage feeding conditioned air to defrosters and side defoggers are provided by the partition plate so as to reduce the number of component parts, to facilitate assembly, and to effectively use the space.

BACKGROUND OF THE INVENTION AND DESCRIPTION OF PRIOR ART

An automobile is often provided with air-conditioning equipment for cooling and warming. In case air-conditioning equipment is provided, conditioned air will be fed and divided into a portion thereof for feeding air into the automobile body for the purpose of cooling, warming or dehumidifying, and a portion thereof for feeding air to defrosters of side defoggers for the purpose of defrosting and defogging the inside surfaces of front and side windows of the automobile.

The air feed of the air-conditioning equipment provided in an automobile (or car) is provided through air blowing ports provided on the front surface of the instrument panel, blowing ports of defrosters provided between the instrument panel and the front window or windshield, and blowing ports of side defoggers provided on both sides of the instrument panel. Thus, the respective air blowing ports are provided as required in different respective places on the instrument panel.

In an automobile provided with air-conditioning equipment, the connection of the respective blowing ports with the air-conditioning equipment and the feed of conditioned air has generally been made as follows. Ducts and nozzles of members separate from the instrument panel are respectively independently provided and are connected with the air-conditioning equipment through flexible tubes or the like.

In such conventional means, first, a duct and nozzle is provided for each blowing port, flexible tubes connecting them with the air-conditioning equipment are required, and fastening and connecting members are also required. The number of component parts is thus very high, and the air-conditioning equipment itself, including the accessories, is consequently very costly.

Secondly, respective members must be arranged on the rear side of the instrument panel and the number of working steps at the time of assembly is necessarily increased. Such assembly work is made in very narrow space, such as on the rear side of the instrument panel, and thus is difficult to perform, is very low in workability, and is undesirable with respect to working efficiency. In addition to the above, the instrument panel is also used as a space for containing various harnesses, and therefore the above-mentioned difficulty of piping and fitting works is increased. Further, the work must be performed so as not to interfere with already-provided harnesses and thus is very difficult and complicated.

Thirdly, the respective ducts and nozzles are fastened and connected through flexible tubes independently, and therefore they collide with or rub at their peripheral parts due to the vibration of the car, and are noisy. Because the respective parts are provided within the car body, they make a noise within the car body and are not desirable in attempting to keep the interior of the car quiet.

The above-mentioned problems in the air-conditioning equipment provided with an automobile are effectively solved by the present invention.

SUMMARY OF THE INVENTION

The present invention provides an instrument panel device for automobiles which includes a closing plate provided on the rear side of an automobile instrument panel to form a closed space between the rear surface of the panel and the closing plate. A partition plate is formed substantially integrally with the closing plate and extends from the closing plate so as to vertically section the closed space into first and second systems of air conduit passages, the first and second systems of air conduit passages being substantially insulated from each other. Ports are disposed on the front surface of the instrument panel for blowing conditioned air into the interior of the automobile, the ports communicating with the first system of air conduit passages. Defroster blowing ports are disposed on the upper surface of the instrument panel for blowing conditioned air into the interior of the automobile, and the defroster blowing ports communicate with the second system of air conduit passages.

An object of the present invention is to provide an instrument panel device for cars wherein a space is formed by closing the rear side of an instrument panel with a closing plate and is vertically sectioned with a partition plate provided integrally with the closing plate so as to provide two systems of passages which are insulated from, and not in interference with, each other. The respective passages are made to communicate with blowing ports on the front surface of the instrument panel, with defroster blowing ports on the upper surface of the instrument panel, and with side defogger blowing ports on the right and left.

Therefore, an object of the present invention is to provide an instrument panel device wherein the dead space on the rear side of the instrument panel can be utilized so that accessory components of air-conditioning equipment can be provided, while effectively utilizing the rather narrow space within the automobile body.

A further object of the present invention is to provide an instrument panel device wherein ducts for conditioned air are provided by utilizing the space on the rear surface of the instrument panel. Therefore, the air-conditioning equipment and the instrument device need not be connected with each other through ducts and nozzles of separate members and through flexible tubes, so that the accessories required in setting the air-conditioning equipment can be greatly decreased.

A further object of the present invention is to provide an instrument panel device wherein not only the component parts are decreased, but also assembly work for the component parts is eliminated so that the assembly work for the air-conditioning equipment may be simplified and assembly labor saved. There is provided an instrument panel device wherein particularly, in consideration of the assembly work within the narrow space on the rear surface of the instrument panel wherein various complicated harnesses are housed, the work can be greatly simplified.

Yet another object of the present invention is to provide an instrument panel device wherein a closing plate is provided integrally with a partition plate on the rear side of a pad core forming the instrument, so that the formation is simplified, labor is saved, the cost of the automobile provided with the air-conditioning equipment is reduced, and the economic utility is high.

A further object of the present invention is to provide an instrument panel device wherein a decorative plate is formed by extending a part of the closing plate arranged on the rear side of the instrument panel so as to be below the instrument panel and to shield the harnesses exposed below the instrument panel. Thus, the look of the interior of the automobile is improved without providing a separate shielding member which requires additional assembly work, and further without providing a separate decorative plate.

Another object of the present invention is to provide an instrument panel device wherein a part of the closing plate is extended below the instrument panel and a box containing air-conditioning auxiliaries is formed on this extension so that the case for the air-conditioning auxiliaries can be obtained without providing a separate box with attendant assembly work. Thus, a more desirable arrangement of the air-conditioning unit and an improvement in the appearance and layout of the air-conditioning equipment will be obtained.

Preferred embodiments of the present invention will be described in detail in the following, with reference to the accompanying drawings, so that further objects, details, and advantages of the present invention will be understood.

BRIEF DESCRIPTION OF THE DRAWINGS

FIG. 3 depicts a vertically sectioned view of another essential part of the instrument panel.

FIG. 4 illustrates a sectioned view of yet another part of the instrument panel.

FIG. 5 is a vertically sectioned view of an essential part of an instrument panel in accordance with a second embodiment of the invention.

FIG. 6 is a vertically sectioned view of an essential part of an instrument panel in accordance with a third embodiment of the invention.

FIG. 7 is a perspective view of the invention panel shown in FIG. 6.

DETAILED DESCRIPTION OF PREFERRED EMBODIMENTS

Figure 1:
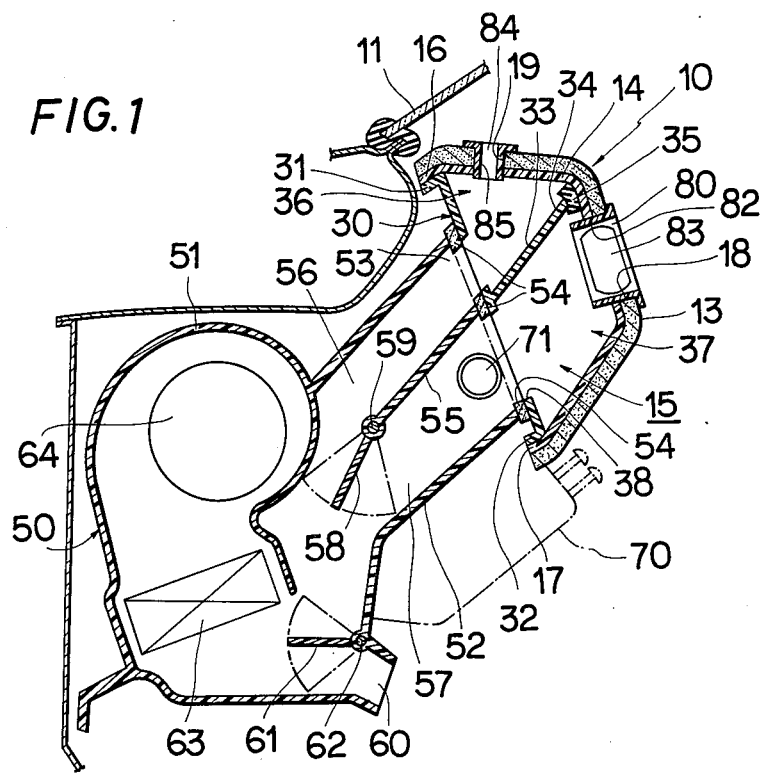
FIG. 1 depicts a vertically sectioned view of an essential part of an instrument panel of an automobile.
Figure 2:
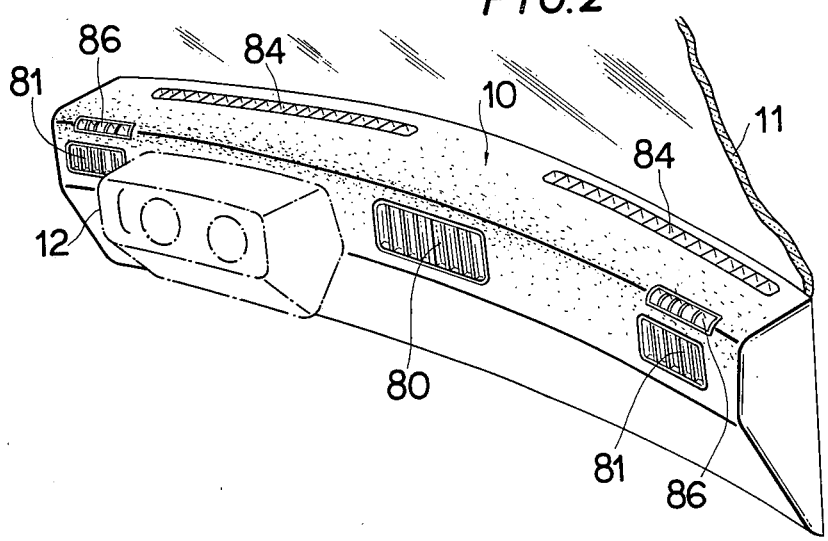
FIG. 2 illustrates a perspective view of the instrument panel shown in FIG. 1.

FIGS. 1 through 4 show the first embodiment of the present invention. As shown in FIG. 2, an instrument panel 10 of an automobile is provided at the lower end of a front window or windshield 11 in the front part of a car body. A meter unit 12 is provided on the front surface on the driver seat side of the instrument panel and conditioned air blowing ports of the air-conditioning equipment are provided on the front surface, upper surface, and right and left on the front side of the instrument panel 10.

The instrument panel 10 is covered with the outermost pad 13 (FIG. 1) made of a soft material. Pad 13 is pasted on its rear side to the surface of a pad core 14. Pad core 14 is formed of a plate-shaped integral molding of plastic or the like and is bent forwardly of the car interior at its upper and lower edges so as to be substantially U-shaped in side section. The pad 13 is so provided as to traverse the front inside of the car and therefore the pad core 14 is provided over the entire width of the car interior and is in contact at both ends thereof with both sides of the front interior of the car.

As described above, because pad core 14 including pad 13 is provided forwardly in the front part of the car body so as to be U-shaped in side section, a curved space 15 will be formed on the rear side of the pad core 14. The space 15 is provided over the entire width of the instrument panel 10.

The space 15 formed on the rear side of instrument panel 10 is closed with a closing plate 30 provided over the entire width thereof. The closing plate 30 (made of plastic as is pad core 14) is jointed at its bent portions 31 and 32 with receiving edges 16 and 17 on the rear surface of pad core 14. In the vertical intermediate part of the front surface (opposed to the rear surface of pad core 14) of closing plate 30, a partition plate 33, molded integrally with closing plate 30 over the entire width thereof, is extended forwardly.

A sealing member 35 (FIGS. 1, 3 and 4) is inserted between the front end 34 of partition plate 33 and the rear surface of pad core 14. The space on the rear side of pad core 14 closed with closing plate 30 is thus substantially vertically sectioned with the partition plate 33. As shown in FIGS. 1 and 3, two series of passages 36 and 37 for conditioned air are thus formed by closing plate 30 and partition plate 33.

As shown in FIG. 1, an air-conditioning unit 50 is provided on the rear side of closing plate 30. An opening 53 provided at the top of a guide tube 52 directed diagonally upwardly of a casing 51 of unit 50 is connected with an opening 38 formed on a part of closing plate 30. The opening 38 of closing plate 30 is provided over the passage 36 such that the base end of partition plate 33 traverses the center of opening 38. The opening 53 of guide tube 52 is connected with opening 38 through a sealing member 54. A partition wall 55 corresponding to partition plate 33 is provided in the center of guide tube 52 to contact at its top end with the base end of plate 33. The top end of partition wall 55 and the base end of partition plate 33 are connected with each other through sealing member 54.

The interior of guide tube 52 of air-conditioner casing 51 is vertically sectioned with the partition wall 55. The base of the wall 55 is positioned near the base of tube 52 so that passages 56 and 57 are provided within the guide tube 52 so as to communicate respectively with passages 36 and 37. A valve member 58 is pivoted at the base end of partition wall 55 through a pin 59. Further, a blowing port 60 directed toward the lower front of the car interior to feed warm air down to the feet of the occupants is provided in the lower part of casing 51. A valve member 61 is pivoted within the blowing port 60 through a pin 62. A heater core 63 is provided within the casing 51 adjacent the base end of the passages 56 and 57 and blowing port 60. A fan 64 is provided in front of heater core 63.

When fan 64 is driven, the heater core 63 is operated and valve member 61 is opened, warm air will be fed down to the occupants' feet through the blowing port 60 and, when both passages 56 and 57 are opened by valve member 58, the warm air will be fed to the vertically sectioned passages 36 and 37 on the rear side of the instrument panel 10 through passages 56 and 57. By the pivotal movement of valve member 58, passages 56 and 57 can be controlled to communicate with passages 36 and 37 simultaneously or alternatively.

It is contemplated that a system utilizing the heat of the engine may be employed in place of the above-described warming system.

In the case of feeding cool air, a cool air feeding port 71 of a cooler unit 70 provided below the instrument panel 10 is connected to passage 57 sectioned with partition wall 55 of guide tube 52. When the blowing port 60 is closed with valve member 61 and further the upper passage 56 is closed through valve member 58, cool air will be fed to the lower passage 37. In case warm air is to be used for defrosters or the like, when the lower passage 57 is closed with valve 58, warm air will be fed to passage 36 through passage 56.

Conditioned air blowing ports are provided on the front surface of instrument panel 10. In FIG. 2, blowing ports 80 and 81 are provided respectively in the middle and on the right and left. Blowing ports 80 and 81 communicate with the lower first passage 37 formed on the rear side of instrument panel 10. The blowing ports 80 and 81 have frame members 82 (FIGS. 1 and 3) fitted in holes 18 formed in pad 13 and core 14 of instrument panel 10. Within the frame 82, an adjuster 83 for adjusting the blowing direction is pivoted.

Defroster blowing ports 84 are provided through nozzle members 85 on the upper surface of instrument panel 10, adjacent the lower end of window or windshield 11 and communicate with the upper second passage 36. A blowing port 86 for a side defogger is provided through a nozzle member 87 as shown in FIG. 4 intermediately between the upper surface and front surface on each of the right and left sides of the instrument panel 10 and communicates with the second passage 36 at each side. Nozzle members 85 and 87 are fitted respectively in holes 19 and 20 provided in the pad 13 and core 14 of instrument panel 10.

Accordingly, as described above, the space on the rear side of instrument panel 10 is closed with closing plate 30 and is vertically sectioned with partition plate 33 so as to form two systems of passages 36 and 37 which communicate with the interior of the car through the blowing ports 80, 81, 84 and 86.

The feed of conditioned air will now be explained.

In the state shown in FIG. 1, valve member 58 is open and valve member 61 of blowing port 60 is also open. In the case of warming, warm air will be fed to blowing port 60 at the feet and to the passages 36 and 37 on the rear side of instrument panel 10 through passages 56 and 57 to be fed into the car interior through blowing ports 80 and 81 on the front surface of instrument panel 10. Also, warm air in the second passage 36 will blow out of blowing ports 84 and 86 and will act as defrosters and defoggers to prevent the frosting or fogging of the front and side windows.

In the case of cool air, the valve members 58 and 61 are closed and cool air from cooler unit 70 is led to passage 37 through passage 57 from opening 71 and is fed into the car interior through blowing ports 80 and 81. In such case, cool air can be stopped from being fed to the system of passages 56 and 36 by closing valve member 58, while the defrosters and side defoggers can be made to function by feeding warm air to passages 56 and 36.

As described hereinabove, by utilizing the rear side of instrument panel 10 and closing the space with closing plate 30 provided with intergrally molded partition plate 33, the passages for conditioned air into the car interior and for the defrosters and side defoggers can be readily formed, and the instrument panel itself can function as a duct for conditioned air, without the need of providing separate ducts or flexible tubes on the lower or rear side of the instrument panel.

FIG. 5 shows a second embodiment of the present invention. There is indicated an instrument panel 10, a pad 13, and a pad core 14. A closing plate 130 is provided with a partition plate 133 in the same manner as described above in the first embodiment. The rear side of pad core 14 is closed with closing plate 130 and is vertically sectioned with partition plte 133. The lower part of closing plate 130 is bent and extended rearwardly (toward the interior of the car) so as to form the bottom 139 of lower chamber 37. The rear edge of bottom plate 139 is lowered to provide a stepped part 140 which is further extended downwardly to provide a decorative plate 141. The lower ends of pad core 14 and pad 13 are bent inwardly and are overlapped on the stepped part 140 so that the lower part of instrument panel 10 may be covered with decorative plate 141 to shield harnesses and other accessories exposed below instrument panel 10. Thereby, the part below the instrument panel within the car interior may be improved in style and appearance.

Because decorative plate 141 is formed integrally with closing plate 130, it can be assembled together with closing plate 130 without requiring special assembly work.

FIGS. 6 and 7 show a third embodiment of the present invention. This embodiment is the same as that described above in basic structure and therefore only the new parts thereof shall be explained, with the same reference numerals being used to indicate the same respective parts.

As shown in FIG. 6, a part of a closing plate 230 is extended downwardly of instrument panel 10, the lower part of this extension 241 being extended rearwardly (toward the interior of the car) so as to be formed to be box-shaped to provide a box 243 having a space 242 therein. A cooler unit is contained in space 242, and control levers 244 of the unit are projected into the car interior through guide holes 246 provided on the front surface 245 of box 243. In the illustrated embodiment, a case 247 for containing an ash tray 248 is provided in the lower part of box 243. Also, in this embodiment box 243 is molded integrally with closing plate 230 so that the air-conditioning auxiliaries and particularly the cooler unit may be contained so that the cooler unit is not exposed below the instrument panel 10. Therefore, it is not necessary to fit in the cooler unit through a separate fitting member, the fitting work is simplified, and the design is very favorable.

In FIG. 6, the partition plate 233 is jointed to the pad core 14 by being fitted in a groove 214 provided in the opposing part of pad core 14.

As shown in FIG. 6, a valve member 258 corresponding to valve member 58 is formed to be larger so as to function as a partition member corresponding to wall 55.

The present invention has been described in detail hereinabove and is believed to be able to be well understood therefrom.

We claim:

1. An instrument panel device for automobiles comprising:

an automobile instrument panel;

a closing plate having a partition plate formed substantially integrally therewith, said closing plate being provided on the rear side of said automobile instrument panel to form a closed space between the rear surface of said instrument panel and said closing plate, said instrument panel, said closing plate, and said closed space extending substantially over the entire width of the automobile;

said partition plate extending from said closing plate so as to substantially vertically section said closed space into first and second systems of air conduit passages, said first and second systems of air conduit passages being substantially separated from each other by said partition plate, and co-extending substantially over the entire width of the automobile;

ports disposed on the front surface of said instrument panel for blowing conditioned air into the interior of the automobile, said ports communicating with said first system of said air conduit passages;

defroster blowing ports disposed on the upper surface of said instrument panel for blowing conditioned air into the interior of the automobile, said defroster blowing ports communicating with said second system of said air conduit passages;

means for selectively distributing conditioned air to said passages; and the top end of said partition plate provided on said closing plate being engaged with a groove provided on the opposing rear surface portion of said instrument panel.

2. An instrument panel device for automobiles comprising:

an automobile instrument panel;

a closing plate having a partition plate formed substantially integrally therewith, said closing plate being provided on the rear side of said automobile instrument panel to form a closed space between the rear surface of said instrument panel and said closing plate, said instrument panel, said closing plate, and said closed space extending substantially over the entire width of the automobile;

said partition plate extending from said closing plate so as to substantially vertically section said closed space into first and second systems of air conduit passages, said first and second systems of air conduit passages being substantially separated from each other by said partition plate, and co-extending substantially over the entire width of the automobile;

ports disposed on the front surface of said instrument panel for blowing conditioned air into the interior of the automobile, said ports communicating with said first system of said air conduit passages;

defroster blowing ports disposed on the upper surface of said instrument panel for blowing conditioned air into the interior of the automobile, said defroster blowing ports communicating with said second system of said air conduit passages;

means for selectively distributing conditioned air to said passages; and at least a part of said closing plate being extended downwardly of said instrument panel so as to form a decorative plate.

3. An instrument panel device for automobiles comprising:

an automobile instrument panel;

a closing plate having a partition plate formed substantially integrally therewith, said closing plate being provided on the rear side of said automobile instrument panel to form a closed space between the rear surface of said instrument panel and said closing plate, said instrument panel, said closing plate, and said closed space extending substantially over the entire width of the automobile;

said partition plate extending from said closing plate so as to substantially vertically section said closed space into first and second systems of air conduit passages, said first and second systems of air conduit passages being substantially separated from each other by said partition plate, and co-extending substantially over the entire width of the automobile;

ports disposed on the front surface of said instrument panel for blowing conditioned air into the interior of the automobile, said ports communicating with said first system of said air conduit passages;

defroster blowing ports disposed on the upper surface of said instrument panel for blowing conditioned air into the interior of the automobile, said defroster blowing ports communicating with said second system of said air conduit passages;

means for selectively distributing conditioned air to said passages;

a part of said closing plate being extended below said instrument panel; and a box for containing air-conditioning auxiliaries being formed on said extended part.

4. An instrument panel device for automobiles according to claim 3, wherein:

an ash tray containing part is provided below said box.

* * * * *